(12) United States Patent
Mahmoodian et al.

(10) Patent No.: US 9,798,083 B2
(45) Date of Patent: Oct. 24, 2017

(54) OPTICAL DEVICE HAVING EFFICIENT LIGHT-MATTER INTERFACE FOR QUANTUM SIMULATIONS

(71) Applicant: UNIVERSITY OF COPENHAGEN, Copenhagen K (DK)

(72) Inventors: Sahand Mahmoodian, København (DK); Immo Nathanael Söllner, København Ø (DK); Søren Stobbe, København V (DK); Peter Lodahl, Birkerød (DK)

(73) Assignee: UNIVERSITY OF COPENHAGEN, Copenhagen K (DK)

( * ) Notice: Subject to any disclaimer, the term of this patent is extended or adjusted under 35 U.S.C. 154(b) by 0 days.

(21) Appl. No.: 15/325,508

(22) PCT Filed: Jul. 7, 2015

(86) PCT No.: PCT/EP2015/065485
§ 371 (c)(1),
(2) Date: Jan. 11, 2017

(87) PCT Pub. No.: WO2016/008771
PCT Pub. Date: Jan. 21, 2016

(65) Prior Publication Data
US 2017/0160474 A1 Jun. 8, 2017

(30) Foreign Application Priority Data
Jul. 14, 2014 (EP) ..................................... 14176853

(51) Int. Cl.
*G02B 6/12* (2006.01)
*G02B 6/122* (2006.01)
(Continued)

(52) U.S. Cl.
CPC ........ *G02B 6/1225* (2013.01); *C09K 11/7492* (2013.01); *G02B 6/107* (2013.01);
(Continued)

(58) Field of Classification Search
CPC .... G02B 6/1225; G02B 6/107; G02B 6/1228; G02B 6/124; G02B 6/305;
(Continued)

(56) References Cited

U.S. PATENT DOCUMENTS 4,439,014 A * 3/1984 Stacy .................... G02F 1/0322
359/247
2003/0206708 A1* 11/2003 Estes ...................... B82Y 20/00
385/130

(Continued)

FOREIGN PATENT DOCUMENTS

WO      2004021056      3/2004

OTHER PUBLICATIONS

Lodahl et al., "Interfacing single photons and single quantum dots with photonic nanostructures," Niels Bohr Institute, University of Copenhagen, Dec. 5, 2013, pp. 2-51.*

(Continued)

*Primary Examiner* — Jerry Blevins
(74) *Attorney, Agent, or Firm* — Duane Morris LLP; Gregory M. Lefkowitz; Jason M. Nolan

(57) ABSTRACT

An optical device comprising a single-photon device, which is coupled to a planar waveguide is described. The planar waveguide comprises a nanostructured section, which includes a longitudinal extending guiding region with a first side and a second side, a first nanostructure arranged on the first side of the guiding region, and a second nanostructure arranged on the second side of the guiding region. The nanostructured section comprises a slow-mode section, in which the single-photon device is positioned or embedded, (Continued)

and in which the first nanostructure and second nanostructure suppress spontaneous emission into other modes. The planar waveguide further comprises a fiber coupler for coupling light out of the planar waveguide and into an optical fiber, the fiber coupler preferably being adapted to match a field profile of an optical fiber.

22 Claims, 4 Drawing Sheets

(51) Int. Cl.
*C09K 11/74* (2006.01)
*G02B 6/30* (2006.01)
*G02B 6/124* (2006.01)
*G02B 6/10* (2006.01)
*G02F 1/035* (2006.01)
*B82Y 20/00* (2011.01)

(52) U.S. Cl.
CPC .......... *G02B 6/124* (2013.01); *G02B 6/1228* (2013.01); *G02B 6/305* (2013.01); *G02F 1/035* (2013.01); *B82Y 20/00* (2013.01); *G02B 2006/12097* (2013.01); *G02B 2006/12164* (2013.01); *Y10S 977/774* (2013.01); *Y10S 977/95* (2013.01)

(58) Field of Classification Search
CPC .......... G02B 2006/12097; G02B 2006/12164; C09K 11/7492; G02F 1/035; B82Y 20/00; Y10S 977/774; Y10S 977/95
USPC .......................................................... 385/14
See application file for complete search history.

(56) References Cited

U.S. PATENT DOCUMENTS

2003/0235370 A1* 12/2003 Taillaert ................ B82Y 20/00
385/50
2011/0150386 A1    6/2011 Dupuis et al.

OTHER PUBLICATIONS

Hugonin et al., "Coupling into slow-mode photonic crystal waveguides," Optics Letters, vol. 32, No. 18, Sep. 5, 2007, pp. 2638-2640.*
Peter Lodahl et al: "Interfacing single photons and single quantum dots with photonic nanostructures", Dec. 4, 2013 (Dec. 4, 2013), XP055158721, Retrieved from the Internet <URL:http://arxiv.org/abs/1312.1079> [retrieved on Dec. 15, 2014].
Hugonin JP etal: "Coupling Into Slow-Mode Photonic Crystal Waveguides", Optics Letters, Optical Society of America, US, vol. 32, No. 18, Sep. 15, 2007 (Sep. 15, 2007), pp. 2638-2640, XP001507929, ISSN: 0146-9592, DOI: 10.1364 / OL.32.002638.
Biswas R. et al: "Impedance of photonic crystals and photonic crystal waveguides", Applied Physics Letters, American Institute of Physics, US, vol. 84, No. 8, Feb. 23, 2004 (Feb. 23, 2004), pp. 1254-1256, XP012062147, ISSN: 0003-6951, DOI: 10.1063/1.1649815.
Tran Quynh et al: "Photonic crystal membrane waveguides with low insertion losses", Applied Physics Letters, American Institute of Physics, US, vol. 95, No. 6, Aug. 13, 2009 (Aug. 13, 2009), pp. 61105-61105, XP012122608, ISSN: 0003-6951, DOI: 10.1063/1.3205452.
C Martijn De Sterke et al: "Efficient coupling into slow light photonic crystal waveguide without transition region: role of evanescent modes", op . Express, vol. 17, No. 20, Sep. 14, 2009 (Sep. 14, 2009), pp. 17338-17343, XP055159146.

* cited by examiner

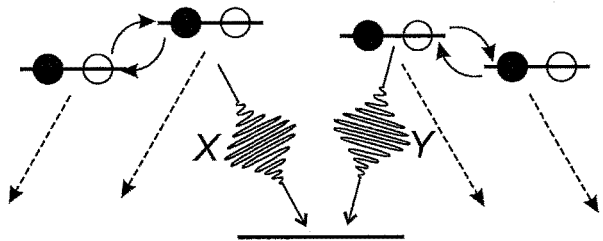
Fig. 1
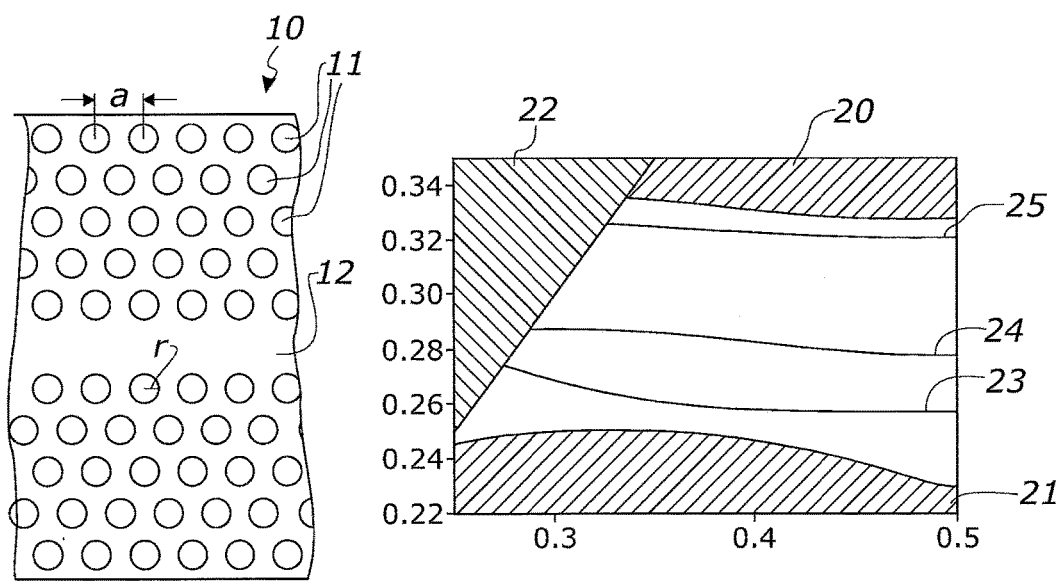
Fig. 2a     Fig. 2b
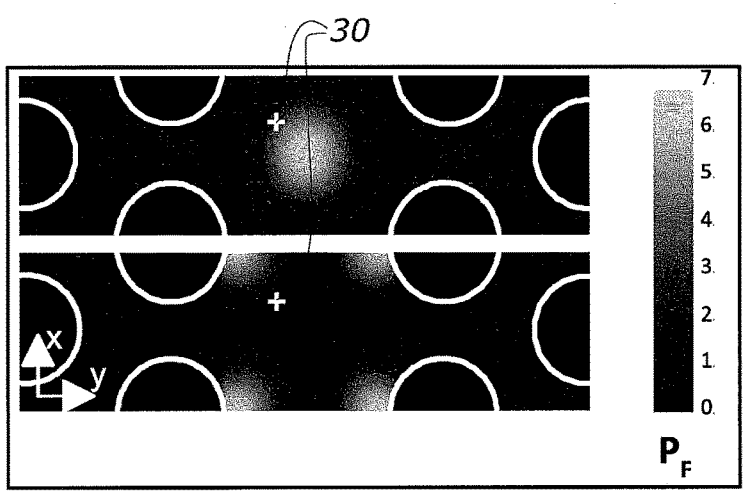
Fig. 3

OPTICAL DEVICE HAVING EFFICIENT LIGHT-MATTER INTERFACE FOR QUANTUM SIMULATIONS

CROSS-REFERENCE TO RELATED APPLICATIONS

This application is a §371 national stage entry of International Application No. PCT/EP2015/065485, filed Jul. 7, 2015, which claims priority to European Patent Application No. 14176853.1, filed Jul. 14, 2014, the entire contents of which are incorporated herein by reference.

FIELD OF THE INVENTION

The present invention relates to an optical device for quantum-information processing and comprising a single-photon device, which is coupled to a planar waveguide.

BACKGROUND OF THE INVENTION

Quantum mechanics was developed as an abstract theory of particles and fields, but it is now understood that it also constitutes the foundation for a novel type of technology, where quantum objects are used as carriers of information. Such quantum technology has revolutionary application prospects for quantum simulations impossible with classical computers, unbreakable quantum cryptography, and quantum sensors with unprecedented capabilities. Optical quantum technology is currently undergoing a revolution due to progress in semiconductor nanotechnology, which on one hand allows studying hitherto unseen synthetic quantum systems and on the other render the production of commercial optical quantum technology viable.

Data on everyday computers are comprised of bits, which are a binary sequence of zeroes and ones. These bits can be stored magnetically on hard drives or electrically on flash drives. In the last few decades quantum information processing using quantum bits or "qubits" has emerged as a completely new form of computation and as previously mentioned carriers of information. Unlike a bit, a single qubit is a quantum mechanical object and can be in a combination or superposition of zero and one states. Qubits can be manipulated and processed to perform computational tasks.

Two common ways to represent a qubit include: using the quantized angular momentum, or spin, of a charged particle, e.g. spin up=0 and spin down=1, or by using photons, e.g. one photon in one particular optical mode=0, while one photon present in a separate mode=1.

Thus, the fundamental resource for photonic quantum technology is a single particle of light, i.e. a photon. However, generating and controlling single photons are challenging tasks. Photonic nanostructures, such as photonic crystals, are particularly useful for this purpose and remarkable progress has been made over the past decade. A key goal is to generate single photons on demand, where the photons are coupled with near-unity efficiency into a single mode and subsequently couple the photons with high efficiency into an optical fibre. Such a highly efficient and deterministic single-photon source could be used for photonic quantum simulators or to establish a new metrological measure of the standard of light intensity, the candela. It could also significantly increase the performance of quantum cryptography systems, where current technology is based on attenuated lasers, which suffer from an intrinsically small average photon number.

It has been suggested that semiconductor quantum dots (QDs) are excellent candidates for stationary qubits. However, many of the prior art systems using quantum light sources, such as QDs, suffer from a low coupling efficiency of about 10% or even lower. However, in order to commercialise photonic devices capable of generating or otherwise processing single photons, it is crucial that the coupling efficiency of the single photons from a single photon emitter and on to an optical fibre is as high as possible and preferably near unity. This enables generating a triggered source of single photons that can be multiplexed. Therefore, the figure of merit for quantum simulation is the efficiency to the Nth power, where N is the number of photons in separate optical modes. About N=40 photons are needed to carry out quantum simulations that cannot be done on classical computers and the scaling of the complexity of problems that can be addressed is dramatic since the built-in parallelism in quantum mechanics is exploited.

For example, 40 photon channels (qubits) correspond to 4 TB of classical information. Taking 40 channels as a benchmark and assuming a 10% efficiency, the probability of creating a useful photonic state is thus 10^(−40), which is a very low probability. With a 90% efficiency, the probability is 1%, and with a 95% efficiency, the success probability even for 80 channels is around 2%. With a MHz repetition rate of generating the single photons, 1-2% efficiency is easily enough to do calculations. To give an idea about the potential of an 80-qubit quantum simulator, 80 qubit quantum channels have a storage capacity of 10,000 times the amount of information stored by mankind.

Peter Lodahl et al.: "Interfacing single photons and single quantum dots with photonic nanostructures", 4 Dec. 2013, ArXiv, is a disclosure by the present inventor group that provides an overview of quantum optics with excitons in single quantum dots embedded in photonic nanostructures.

Accordingly, it is seen that there is a need for optical devices which with a high efficiency can couple single-photons from a single-photon source to an optical fibre or alternatively couple single-photons from an optical fibre to a single-photon detector.

SUMMARY OF THE INVENTION

It is an object of the invention to obtain an optical device, which overcomes or ameliorates at least one of the disadvantages of the prior art or which provides a useful alternative.

According to the invention, this is obtained by an optical device comprising:
  a single-photon device, which is coupled to a planar waveguide, wherein
  the planar waveguide comprises a nanostructured section, which includes:
    a longitudinal extending guiding region with a first side and a second side,
    a first nanostructure arranged on the first side of the guiding region, and
    a second nanostructure arranged on the second side of the guiding region, wherein the nanostructured section comprises:
    a slow-mode section, in which the single-photon device is positioned or embedded, and in which the first nanostructure and second nanostructure suppress spontaneous emission into other modes,
  wherein the planar waveguide further comprises:
    a fibre coupler for coupling light out of the planar waveguide and into an optical fibre, the fibre coupler preferably being adapted so that the outcoupled field matches the field profile of the optical fibre.

This setup with a single-photon device arranged on or embedded in a planar waveguide with a slow-mode section provides a highly efficient fibre-coupled single-photon device, such as a single-photon source or a single-photon detector. The slow-mode section ensures a light-matter interface, where a single photon with very high efficiency can be coupled to the waveguide (for a single-photon source) or be detected (for a single-photon detector), since light is slowed down and light-matter coupling is increased dramatically. At the same time, the surrounding nanostructure suppresses spontaneous emission into all other modes, thereby increasing effective coupling to the desired guided mode. Further, by providing an efficient fibre coupler, it is ensured that single photons from the optical device may be more efficiently delayed in a subsequent optical fibre than on chip, and the setup thus overall provides a device, where single-photons may be more efficiently generated and controlled.

The system can generate a single photon with more than 90% efficiency and couple it to an optical fibre, and it is contemplated that an efficiency of more than 95% may be achieved, which is a huge improvement over known systems.

The slow-mode section is adapted to guide slow modes in the longitudinal direction of the planar waveguide. The slow-mode section is designed so that a group velocity $v_g$ of guided modes is significantly lower than c/n, where c is the velocity of light and n is the refractive index of the waveguide material. The group velocity may for instance be at least a factor 2 lower than c/n (or correspondingly of the phase velocity $v_p$ of the guided mode). Another measure for the slow-mode section is the group index $n_g$. Advantageously, the group index $n_g=c/v_g$ is at least 5, more advantageously at least 7, and even more advantageously at least 10. Even further, $n_g$ may be at least 15, or at least 20, or at least 25. The group index $n_g$ may for instance lie in the range 20-200, or 25-150, or 30-120. Accordingly, the slow-mode section may also be denoted high group index (high-$n_g$) section.

It is recognised that the slow-mode section can be designed in a number of ways in order to provide slow group velocity guided modes. This may depend on the thickness of the membrane, the width of the waveguideing region as well as the refractive indices of the material that make up the nanostructures (typically varying between the refractive index of the material and 1, due to the use of air holes), and the lattice or period constant of the nanostructures. Thus, it is seen that the key is to provide guided modes with low group velocity, which may be achieved by utilising modes close to the Brillouin zone edge.

It should be noted that the term "longitudinal" does not mean that the guiding region is necessarily arranged along a straight line. It means that the light in general propagates in a given direction of the waveguide.

It is also noted that the term nanostructure should also not be perceived in a too limiting manner. It merely indicates that the nanostructure has relative small dimensions e.g. in the size from tens of nanometers to thousands of nanometers. A nanostructure comprises a plurality of holes, which is arranged in a background material, where the material of the holes and the material of the background material have different refractive indices. The holes may be air holes or holes made from a different material than the background material. Accordingly, the first nanostructure may comprise first holes on a first side of the guiding region, and the second nanostructure may comprise second holes on a second side of the guiding region Further, the term "optical" should also not be perceived in a too limiting manner, and it is recognised that the optical range comprises both infrared light, visible light and ultraviolet light. Further, it is also conceived that the invention is applicable for microwaves, x-rays and the like, in particular for a detector setup. Accordingly, the term may also encompass such frequencies and wavelengths, although the preferred wavelength range comprises the range from infrared light to ultraviolet light. The nanostructures should of course be designed according to the given frequency and wavelength range.

According to a preferred embodiment, the planar waveguide further comprises a fast-mode section arranged after the slow-mode section. By having a fast-mode section, it is ensured that photons can more efficiently be routed on-chip and coupled off-chip using fast-light modes.

The fast-mode section is adapted to guide fast modes in the longitudinal direction of the planar waveguide. The fast-mode section (as opposed to the slow-mode section) is designed so that a group velocity $v_g$ of guided modes is approximately equal to c/n. Preferably, $v_g$ is at least 90% of c/n, and even more preferably $v_g$ is at least 95% of c/n. In other words the group index $n_g$ is close to n. Accordingly, the fast-mode section is also denoted low group index (low-$n_g$) section.

In one embodiment, the fast-mode section is directly coupled to the slow-mode section, and the fast-mode section and slow-mode section are impedance matched. By impedance matching the two sections, which can be done due to evanescent modes in the waveguide, the two sections can be directly coupled without significant reflection losses.

Alternatively, the planar waveguide further comprises a slow-to-fast mode transition section arranged after the slow-mode section providing a transition from slow-mode light to fast-mode light. Preferably, the slow-to-fast mode section is arranged between the slow-mode section and the fast-mode section. The slow-to-fast transition section can be adapted to gradually change the guided modes so that the group velocity of the two sections gradually approach each other. Alternatively, the slow-to-fast transition can be comprised of just a few rows of holes where instead of gradually changing the group velocity, abrupt changes in lattice constant can be used to optimize the impedance matching between the slow-mode and the fast-mode region.

According to an advantageous embodiment, the fibre coupler comprises an out-of-plane grating-to-fibre coupler having a second width and being adapted to coupling light out of the device and matching the field profile of an optical fibre, e.g. wherein the out-of-plane grating-to-fibre coupler comprises a first order or second order fibre Bragg grating. Advantageously the out-of-plane grating-to-fibre coupler comprises a second order Bragg grating.

In another advantageous embodiment, the planar waveguide comprises a ridge waveguide having a first width and arranged so that the fast-mode light from the nano-structured section is coupled into the ridge waveguide. Accordingly, the ridge waveguide is arranged between the fast-mode section and the fibre coupler.

The planar waveguide may further comprise a pre-grating transition section having a gradual transition from the first width to the second width, which is arranged between the ridge waveguide and the grating-to-fibre coupler.

The ridge waveguide is utilised in order to ensure that the guided modes are well-defined so at to be efficiently coupled-out from the fibre coupler, e.g. the out-of-plane grating-to-fibre coupler, to an optical fibre arranged with an end at the fibre coupler.

The combination of a single-photon device arranged on or embedded in a planar waveguide having a slow-mode section, a fast-mode section (and optionally a slow-to-fast mode transition section) arranged after the slow-mode section, a ridge waveguide, a pre-grating transition section and an out-of-plane grating-to-fibre coupler provides a highly advantageous and preferred embodiment.

Thus, it is seen that the optical device comprises a planar waveguide which comprises a nanostructured section with a slow-mode section and a subsequent slow-to-fast mode transition section, the nanostructured section being coupled to a ridge waveguide, which in turn is coupled to a pre-grating transition section, which finally is coupled to an out-of-plane grating-to-fibre coupler.

This setup provides a highly efficient fibre-coupled single-photon device, such as a single-photon source or a single-photon detector. The slow-mode section ensures that a single photon with very high efficiency can be coupled to the waveguide (for a single-photon source) or be detected (for a single-photon detector), since light is slowed down and light-matter coupling is increased dramatically. At the same time, the surrounding nanostructure suppresses spontaneous emission into all other mode, thereby increasing effective coupling to the desired guided mode. The emission or detection can thereby be carried out with near-unity probability. The fast-mode section and optional slow-to-fast mode transition section (or fast-to-slow transition section when acting in reverse) ensure that photons can more efficiently be routed on-chip and coupled off-chip using fast-light modes. The nanostructured section is coupled to a ridge waveguide with a high efficiency, since fast-modes from nanostructured waveguides couples efficiently to ridge waveguide modes. The width of the ridge waveguide gradually changes in the pre-grating transition section so that the width is of the order of the width of a core diameter of an optical fibre that is coupled from the out-of-plane grating-to-fibre coupler.

It is noted that the device is described as coupled in a specific direction (for a single-photon source) but that the device also functions in reverse (for a single-photon detector).

According to a particular advantageous embodiment, the optical device is made of an III-V semiconductor material. Thereby, the nanostructured section may be formed as a membrane, which is compatible with single-photon sources, such as quantum dots, or single-photon detector devices, such as nanowires or superconducting wires.

The planar waveguide may for instance be made from a dielectric material, such as a III-V semiconductor material. The material may for instance be made of Gallium Arsenide (GaAs), Indium Gallium Arsenide (InGaAs), or Aluminium Arsenide (AlAs). This is particularly suited for the optical device operating as an emitter. However, for an optical device operating as a detector, it is also contemplated to make the device from Silicon-based materials.

The optical device may advantageously be provided on a single substrate. The substrate can be manufactured in one or a few steps and thus be mass-produced in manufacturing facilities known per se.

In one embodiment, the nanostructured section is a photonic crystal waveguide. This provides a particular advantageous embodiment compatible with single-photon devices.

The nanostructured section may advantageously comprise a termination at a proximal longitudinal end of the slow-mode section. Thereby, the coupling efficiency to the intended propagation direction may be improved with a factor two. In an alternative embodiment, the optical device comprises a second region with the same section as the first region, e.g. in a direction opposite the longitudinal direction. Accordingly, single photons emitted in an opposite direction may be directed through an additional slow-mode section, an additional slow-to-fast mode transition region, an additional ridge waveguide, an additional pre-grating transition region, and an additional out-of-plane fibre-to-grating coupler.

In one embodiment, the first nanostructure and/or the second nanostructure comprise air holes. However, in principle the nanostructure may also be made of a different material than the remainder of the planar waveguide material and having a refractive index being different from that of the remainder.

The nanostructured section may be made of a material having a refractive index in the region of 2-5, or 2.5-4.5, e.g. around 3.5. Thus, the material may be made of e.g. a high refractive index dielectric. Additionally or alternatively, a difference in refractive index of the planar waveguide material and the first and second nanostructures, i.e. a difference between the material of the holes of the nanostructured section and the background material, may be in the region of 1-4, or 1.5-3.5, e.g. around 2.5.

In another embodiment, the planar waveguide is adapted to guide light within a wavelength interval in the region of 620-1200 nm, and wherein the single-photon device emits or detects photons having a wavelength within the mentioned interval.

In one advantageous embodiment, the first nanostructure and the second nanostructure in at least the slow-mode section are arranged in a first lattice structure and a second lattice structure, respectively, and advantageously in a triangular lattice having a lattice constant a.

In general the design of the nanostructure, e.g. the lattice structure of the photonic crystal waveguide, should be matched to the desired guided modes.

The lattice constant a lies in the interval 100-500 nm, or 150-400 nm, or 200-300 nm, e.g. around 250 nm.

In one embodiment, the holes of the nanostructures are substantially circularly shaped and have a radius of between 0.2a and 0.4a, e.g. around 0.3a.

The width of the guiding region may for instance be in the region 100-1000 nm. The guiding region is often formed by removing a line of holes. Accordingly, the transverse distance between centres of proximal nanostructures (e.g. holes) on the first side and the second side is $\sqrt{3}$ times the lattice constant a.

The planar waveguide may advantageously have a thickness of between 0.2a and 1a, or between 0.4a and 0.8a, or between 0.3a and 0.7a, e.g. around 0.5a or 0.6a. Alternatively, the planar waveguide may have a thickness in the range of 50-500 nm, or 75-350 nm, or 100-250 nm, e.g. around 150 nm. Accordingly, it is seen that the planar waveguide is a slab waveguide or also what in the technical area is called a membrane.

The planar waveguide is advantageously designed as a floating structure along at least a substantial part of the planar waveguide. Such a design minimises the losses by minimising light being coupled out of the plane.

According to an advantageous embodiment, the first nanostructure and the second nanostructure in the fast mode section is stretched in the longitudinal direction so that a mutual longitudinal distance between holes in the slow-mode section is at least 2%, advantageously at least 5%, larger than the mutual longitudinal distance in the slow-mode section. The transverse lattice spacing is preferably constant from the slow-mode section to the fast-mode section. By stretching the lattice in the longitudinal direction and keeping the lattice spacing constant in the transverse direction, it is ensured that the slow-mode section and fast-mode section are impedance matched and that no reflection losses occur.

The mutual longitudinal distance of the holes of the nanostructures may be gradually increasing in the slow-to-fast mode transition section between the slow-mode section and the fast-mode section.

In a particularly advantageous embodiment, the single-photon device is embedded in the slow-mode section of the nanostructured section.

The single-photon device may for instance be epitaxial grown, e.g. via molecular beam epitaxy, or deposition. Accordingly, the optical device provides a highly efficient single-photon source, which is coupled to an optical fibre. Delays of single photons may more efficiently be delayed in an optical fibre than on-chip, and the setup thus provides a device, where single-photons may more efficiently be generated and controlled. The single-photon source is preferably adapted to generate single-photons in the wavelength range of infrared light, visible light, and ultraviolet light.

The single-photon device may advantageously be a single-photon emitter, such as a quantum dot. The quantum dot advantageously has a height of 1-10 nm, and an in-plane size in the range of 10-70 nm. The quantum dot may consist of $10^4$ to $10^6$ number of atoms. The quantum dot may be made from a III-V semiconductor material, e.g. InGaAs.

In another particularly advantageous embodiment, the single-photon device is a single-photon receiver, such as a nanowire or a super-conducting wire. Thereby, the optical device provides a highly efficient single-photon detector setup with a very small dead time. The use of a slow-mode section ensures that the super conducting wire constituting the detector can be made much shorter than prior art systems, which in turn reduced the time constant of the detection circuit by a factor of 20-100. The single-photon detector setup is preferably adapted to detect single-photons in the wavelength range of infrared light, visible light, and ultraviolet light. However, the detector setup may also be adapted to detect other wavelength, such as in the microwave range, the x-ray range or the like. The single-photon receiver is advantageously arranged on substrate in the guiding region of the slow-mode section.

In one embodiment, a width of the guiding region is 0.5 to 2 times a lattice constant of the first nanostructure and the second nanostructure, alternatively the width is in the region 125-500 nm.

The first width may advantageously match a width of the guiding region of the nanostructured section, e.g. being 0.5-1.5 times said width of said guiding region, or being 0.75-1.25 times said width. Accordingly, the first width being the width of the ridge waveguide may also for instance be 125-500 nm.

The slow-mode section advantageously has a longitudinal extent of at least 4, and preferably at least 5 lattice constants a. Thereby, it is ensured that the emitted photon has a sufficient length to couple to the guided mode of the planar waveguide. Preferably, the longitudinal extent of the slow-mode section is less than or equal to 80 lattice constants a, advantageously less than or equal to 60, 50, 40, 30, or 20 lattice constants a. If the slow-mode section becomes too long, the waveguide start to become lossy and thereby lowers the coupling efficiency.

The fast-mode section advantageously has a longitudinal extent of at least 4, and preferably at least 5 lattice constants a. Thereby, it is ensured that the emitted photon has a sufficient length to couple to the guided mode of the planar waveguide. Preferably, the longitudinal extent of the slow-mode section is less than or equal to 80 lattice constants a, advantageously less than or equal to 60, 50, 40, 30, or 20 lattice constants a.

In embodiments with a slow-to-fast mode transition section, this section may for instance have a length in the range 2-10 lattice constants a.

In one embodiment, the second width is 1.0-15 um, or 1.0-12 um. Thus, the width of the grating roughly corresponds to that of the core diameter of a single-mode fibre, which is typically in the range from 1-10 micrometers.

In another embodiment, a first side and a second side of the pre-grating transition section gradually diverges from the first width to the second width. In other words, the waveguide is tapered from the grating and towards the ridge waveguide and nanostructured section.

It is recognized that this tapered (or diverging) waveguide section may be designed in a number of ways. However, the two sides may advantageously be straight and mirror symmetric about the longitudinal direction. However, in principle the diversion angles of the first side and second side may be different. Further, the diversion angles may be varying in the longitudinal direction.

In yet another embodiment, the first side and second side of the pre-grating transition section on average diverges with an angle in the region of 1-90 degrees. The length of the transition region depends on the widths of the ridge waveguide and grating, respectively, as well as the restrictions on the taper section.

In one advantageous embodiment, the out-of-plane grating-to-fibre coupler comprises surface gratings. This may for instance be carried out by etching small grooves into the surface of the ridge waveguide. It is also possible to achieve the out-coupling of light via a phase hologram.

The longitudinal extent of the out-of-plane grating-to-fibre coupler may for instance be in the range 1.0-20 um. Similarly to the width, the longitudinal extent may roughly correspond to that of the core diameter of a single-mode fibre, which is typically in the range from 1-10 micrometers.

The out-of-plane grating-to-fibre coupler may for instance have a grating period of 100-1000 nm, or 200-750 nm, or 300-500 nm.

In one advantageous embodiment, the optical device further comprises an optical fibre having a first end arranged so as to be able to couple in light from the out-of-plane grating-to-fibre coupler, alternatively couple light emitted from the first end into the out-of-plane grating-to-fibre coupler.

The optical fibre may advantageously be a single-mode fibre.

In one embodiment, the optical device is further coupled to a multiplexing setup utilising a pockels cell. In another embodiment, the pockels cell is arranged in a loop. In yet another embodiment, the optical device is adapted to generate parallel trains of single photons multiplexed into individual optical fibres.

BRIEF DESCRIPTION OF THE FIGURES

The invention is explained in detail below with reference to embodiments shown in the drawings, in which FIG. 1 shows an example of a single quantum dot level scheme, FIG. 2 shows a photonic crystal waveguide structure and corresponding propagating mode bands, FIG. 3 shows a spatial map of the Purcell-factor.

DETAILED DESCRIPTION OF THE FIGURES

Figure 4:
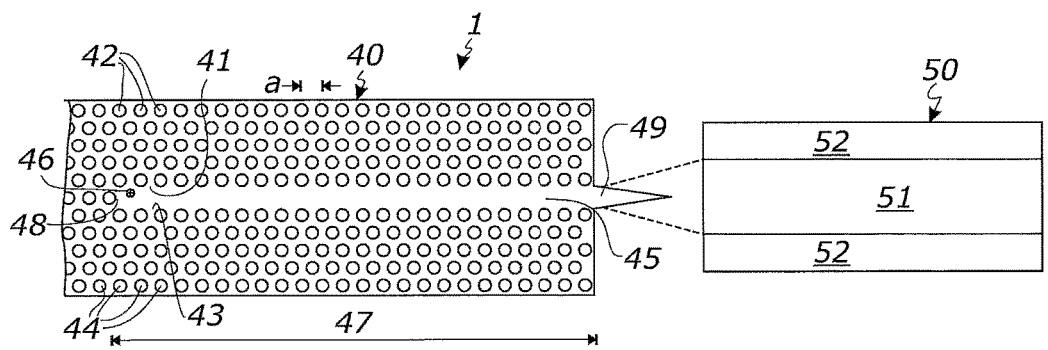
FIG. 4 shows one embodiment of an optical device according to the invention.

The present invention relates to an optical device for quantum simulations and quantum-information processing.

The primary quantum emitters, which are discussed in this document, are self-assembled InGaAs quantum dots embedded in a GaAs planar waveguide. Such emitters have several distinct excitonic transitions and FIG. 1 shows one example of the energy-level structures involved in such transitions.

In FIG. 1, the level structure corresponding to the neutral exciton is shown, and the different decay processes are indicated. The two optically allowed transitions, X and Y, are coherent superpositions of the ±1 spin eigenstates of the system, when ignoring the exchange interaction. The transitions are linearly polarized and are split in energy due to the exchange interaction. This splitting arises due to the lack of cylindrical symmetry in the confinement potential of most quantum dots. The remaining two states of the neutral exciton manifold are the dark states, which are connected to the ground state via an optically forbidden transition, non-radiative decay (dotted lines in FIG. 1), and to the bright exciton via spin-flip processes (black line in FIG. 1). For QDs in a bulk GaAs environment, the two dipole transition moments will have very similar oscillator strengths, and in such studies the neutral exciton manifold is often reduced to just two excited levels, namely the bright and the dark exciton. This leads to a bi-exponential decay, when measuring the dynamics of the excited state.

FIG. 2a shows a photonic crystal structure 10 with a line defect 11 used in the invention, and FIG. 2b shows a corresponding band diagram of the simple line defect having three propagating modes 23, 24, 25.

Photonic crystals are created through a periodic modulation of the refractive index of a material. Bragg scattering at the interfaces leads to the formation of photonic band gaps, akin to electronic band gaps in semiconductors. In the present invention, the photonic crystals are formed by a periodic array of air holes 12 (n≈1) in a GaAs membrane (n≈15). Removing or shifting holes in an otherwise perfect lattice will lead to the formation of defect states within the band gap.

Ultimately, we are interested in the interaction between the defect mode and the in-plane transition dipole of a QD, and therefore only the TE-like modes of the structure are plotted in the figure. In the upper region 20 and lower region 21, there are a continuum of allowed slab guided modes that are not bound to the defect; hence these regions mark the edges of the band gap. The region 22 in the upper, left corner indicates the light-cone, which contains a continuum of leaky modes that are not bound to the slab. The group velocity, $v_g$, of the waveguide mode is given by the slope, which goes to zero as we approach the Brillouin zone edge. Thus the group index, $n_g = c/v_g$, of the mode diverges at the Brillouin zone edge. Typically, the fundamental mode 23 is utilized, and the wavelength of single photons emitted from the quantum dot should be matched with the intended waveguide mode.

Combining the quantum dots with the photonic crystal structure, we now look at the light-matter coupling between a single quantum dot and the fundamental mode of a photonic crystal waveguide. First, we should note that the transition dipoles leading to the x- and y-polarized emission are predominantly aligned along the crystallographic directions of the GaAs substrate. Using cleaved edges of the sample as a reference, the photonic nano-structures can be aligned along the same crystallographic directions. Since the decay rate of the emitter in the waveguide is proportional to the projection of the electric field onto the transition dipole moment $$\Gamma \propto |E(r_d) \cdot d|^2,$$

and the waveguide structure is aligned along the same axes as the transition dipoles, it follows that the decay rate of the x- and y-polarized transitions are maximized at the extreme of the x- and y-projections of the electric field, respectively. The ratio between the decay rate of an emitter embedded in a nano-structure and the decay rate of an emitter in bulk is called the Purcell-factor. In FIG. 3 a spatial map of the Purcell-factor of the y-polarized dipole (top) and x-polarized dipole (bottom) at $n_g = 36$ is shown. For a transition dipole moment optimally aligned with the electric field and positioned at the antinode of the mode-profile the Purcell-factor is given by:

$$P_F(\omega) = \left( \frac{3\lambda^2 a}{4(\pi n^3 V_{eff})} \right) n_g(\omega).$$

The white cross 30 in FIG. 3 marks a position, where both dipoles are noticeably Purcell enhanced, but to a very different degree.

In order to improve the light-matter coupling interface, the waveguide may be provided with a slow-mode section, where the group velocity is relatively low and the group index relatively high. Since light is slowed down, the light-matter coupling is increased dramatically. At the same time, the surrounding nanostructure suppresses spontaneous emission into all other mode, thereby increasing effective coupling to the desired guided mode.

Further, by providing a conventional waveguide part, such as a ridge waveguide, it is ensured that the guided modes may be efficiently coupled-out from the fibre coupler.

An optical device 1 according to the invention comprising such waveguide parts is illustrated in FIG. 4. The optical device 1 comprises a planar waveguide 40, which comprises a longitudinal extending guiding region 45 with a first side 41 and a second side 42. A first nanostructure 42 comprising air holes arranged in a triangular lattice structure with a lattice constant a is located on the first side 41 of the guiding region 45, and a second nanostructure 44 comprising holes arranged in triangular lattice structure with a lattice constant a is located on the second side 42 of the guiding region 45.

It is seen that the guiding region 45 may be formed by providing a line defect in the lattice structure by removing a row of holes.

A quantum emitter 46, e.g. in form of a quantum dot, is embedded in the guiding region 45 of the nanostructured section. The planar waveguide 40 is designed so that a slow-mode section 47 (or a high group index (high-$n_g$) section) is formed in the nanostructured section. As previously explained, the slow-mode section ensures a light-matter interface, where a single photon emitted from the quantum emitter 46 with very high efficiency can be coupled to the planar waveguide 40, since light is slowed down and light-matter coupling is increased dramatically. At the same time, the surrounding nanostructure suppresses spontaneous emission into all other modes, thereby increasing effective coupling to the desired guided mode.

The slow-mode section 47 is adapted to guide slow modes in the longitudinal direction of the planar waveguide. The slow-mode section is designed so that a group velocity $v_g$ of guided modes is significantly lower than c/n, where c is the velocity of light and n is the refractive index of the waveguide material, or in other words that the group index $n_g$ is high. The group index $n_g$ may for instance be at least 20 and advantageously lie in the region 30-150.

The slow-mode section 47 can be designed in a number of ways in order to provide slow group velocity guided modes. This may depend on the thickness of the planar waveguide, the refractive index of the planar waveguide as well as the refractive index of the nanostructures (although often being approximately 1 due to the use of air holes), and the lattice or period constant as well as size of the nanostructures. Thus, it is seen that the key is to provide guided modes with low group velocity, which may be achieved by utilising modes close to the Brillouin zone edge as previously explained, where the group index is high.

The planar waveguide 40 further comprises a fibre coupler 49 in form of a tapered ridge waveguide. The tapered ridge waveguide is shown schematically, and it is noted that the taper angle is normally more shallow than depicted. The tapered ridge waveguide may for instance have a length of approximately 6a, 12a, 18a, or 24a. The fibre coupler 49 couples light, i.e. the guided single photons, out of the planar waveguide 40 and into a single-mode optical fibre 50 having a core 51 and a surrounding cladding region 52. By providing an efficient fibre coupler 49, it is ensured that single photons from the optical device may more efficiently be delayed in a subsequent optical fibre than on-chip, and the setup thus overall provides a device, where single-photons may more efficiently be generated and controlled.

It is seen that the guiding region 45 or line defect comprises a termination 48 at a proximal end of the slow-mode section 47. Thereby, the coupling efficiency to the intended propagation direction may be improved with a factor two. The termination may also be obtained using photonic-crystal waveguide with different lattice parameter along the longitudinal direction or by a different arrangement of the holes as compared to the termination shown in FIG. 4. However, in principle, the setup may also work without the termination and with a second slow-mode section and a second fibre coupler on the other side of the quantum dot.

However, coupling losses may occur, when a nanostructured slow-mode section is coupled directly to a conventional waveguide part. In order to improve the overall coupling efficiency, the nanostructured waveguide (or photonic crystal waveguide) may further comprise a fast-mode section in order to convert the guided modes to fast modes having a group velocity close to the phase velocity, i.e. a group velocity close to c/n, and where the ground index is close to n.

Figure 5A:
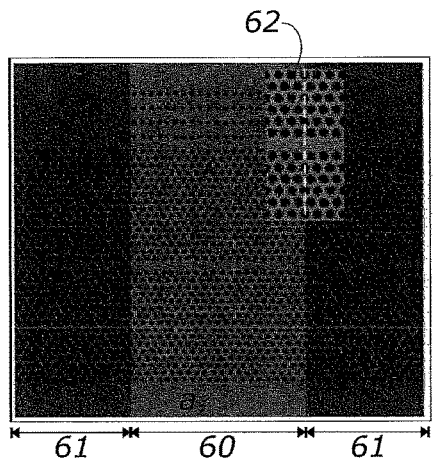
FIG. 5 shows a SEM image of a photonic crystal waveguide comprising a slow-mode section and two fast-mode sections and the corresponding waveguide bands.

As previously mentioned, fibre out-couplers work best in the fast-light regime (low-$n_g$ mode), while light-matter interaction is stronger in the slow-light regime (high-$n_g$ mode). However, the direct coupling from a nanostructured slow-mode section and to a ridge waveguide or out-coupler may be lossy due to impedance mismatch between the two modes. In order to lower this loss, the invention solves this by providing two different nanostructured waveguide sections in the photonic crystal waveguide as shown in FIG. 5a, viz. a slow-mode section 60 and a fast-mode section 61.

Figure 5B:
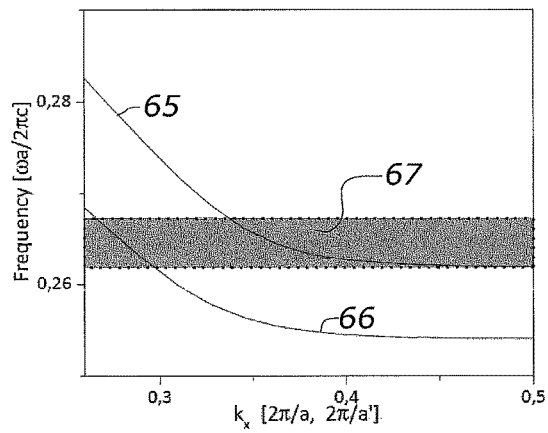

The corresponding band structure of the two regions is shown in FIG. 5b, where it is clearly seen that a fast-mode waveguide band 66 has a region of low-$n_g$ modes overlapping with regions of high-$n_g$ modes of a slow-mode waveguide band 65. FIG. 5b shows the waveguide bands 65, 66 for the two photonic crystal waveguide sections 60, 61 and are plotted for the same frequency axes. The utilized frequency range for impedance matching is marked as a box 67 with a dotted outline. These bands 65, 66 were calculated for a membrane thickness of h=(⅔)a and a radius of r=0.3a.

Intuitively one would think that the reflection coefficient at such an interface scales as the standard Fresnel coefficient, and there will be significant reflection, when coupling two modes of different $n_g$. This can be argued by considering the two waveguides as two different effective media and the Poynting vector across such an interface. While the direction of the Poynting vector gives the direction of the energy flow, its magnitude is given by the intensity I=$uv_g$, where u denotes the energy density and $v_g$ is the group velocity of the mode. The energy density is given by $$u = \frac{1}{2}\left(\epsilon E^2 + \frac{B^2}{\mu_0}\right),$$

where $\epsilon$ is the absolute permittivity, $\mu_0$ is the vacuum permeability, and E and B are the electric and the magnetic fields.

Looking at the dashed line 62 in FIG. 5a, which marks the transition between the two waveguide sections, it is seen that the absolute permittivity is continuous across this line and hence the field is continuous across the dotted line 62. Therefore, the energy density on both sides of the line should also be continuous, but the group velocities in the two sections are very different, leading to drastically different magnitudes of the Poynting vectors in the two PCW sections 60, 61, when considered independently.

Since, there cannot be a pileup of energy at the boundary, there must be a significant reflection in the transition region. This argument, however, ignores the transverse profile of the mode and implicitly assumes that the two Bloch modes propagating at different speeds have similar shapes. While this almost holds for photonic crystal waveguides in a square photonic crystal lattice, this is not the case for photonic crystal waveguides in a hexagonal photonic crystal lattice. This decreased impedance mismatch between different group velocity modes in hexagonal lattice photonic crystal waveguides can be exploited, and low-$n_g$ modes are used as efficient injectors into high-$n_g$ modes or vice versa.

The low-$n_g$ waveguide section 61 may be achieved by stretching the lattice in the x-direction, so that $a_2$=(450/420) $a_1$, i.e. stretching the lattice by approximately 7%, while keeping the lattice spacing constant in the y-direction.

Hence, the fast-mode section of the waveguide is also sometimes denoted as the stretched lattice waveguide. Additional small changes to the periodicity of the lattice right at the transition between the two waveguide sections 60, 61 can be used to create a coupling region which increases the injection efficiency, e.g. by having a transition section, where the lattice is gradually stretched in the x-direction.

Figure 6:
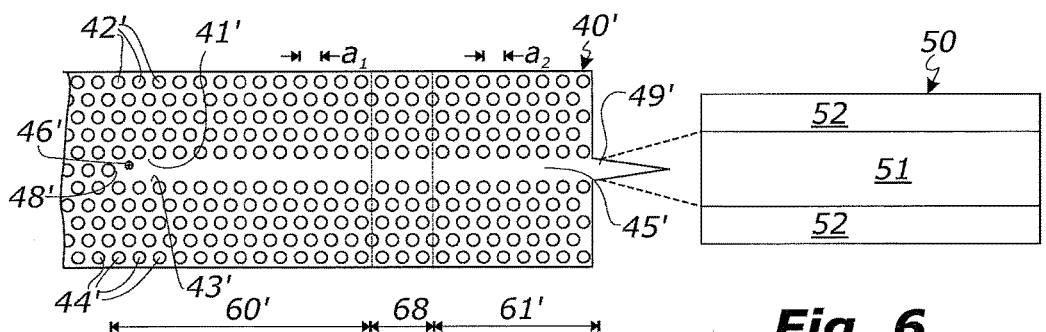
FIG. 6 shows one embodiment of an optical device according to the invention.

FIG. 6 illustrates an embodiment, which combines the fibre coupler of FIG. 4 with slow-to-fast mode conversion scheme as explained above. The embodiment shown in FIG. 6 corresponds to the embodiment shown in FIG. 4 and like numerals refer to like parts.

The embodiment differs in that the nanostructured section of the planar waveguide comprises a slow-mode section 60' (or high-$n_g$ section) and a fast-mode section 61' (or low-$n_g$ section). As previously mentioned the lattice structure in the fast-mode section 61' may be stretched in the longitudinal x-direction of the planar waveguide such that $a_2 = k\, a_1$, where k as in the previous example may be approximately 1.07. The nanostructured section may further optionally comprise a slow-to-fast mode transition section 68, where the nanostructure gradually changes from the nanostructure of the slow-mode section 60' to the nanostructure of the fast-mode section 61'.

Similar to the embodiment of FIG. 4, the planar waveguide comprises a fibre coupler 49' in form of a tapered ridge waveguide, which couples light out of the planar waveguide 40' and into a single-mode optical fibre 50 having a core 51 and a surrounding cladding region 52. The utilisation of a slow-mode section 60', a fast-mode section 61', and the optional slow-to-fast mode transition section 68 provides a more efficient conversion to fast modes, which can effectively be coupled into the ridge waveguide 49' and out of the planar waveguide 49'.

Figure 7:
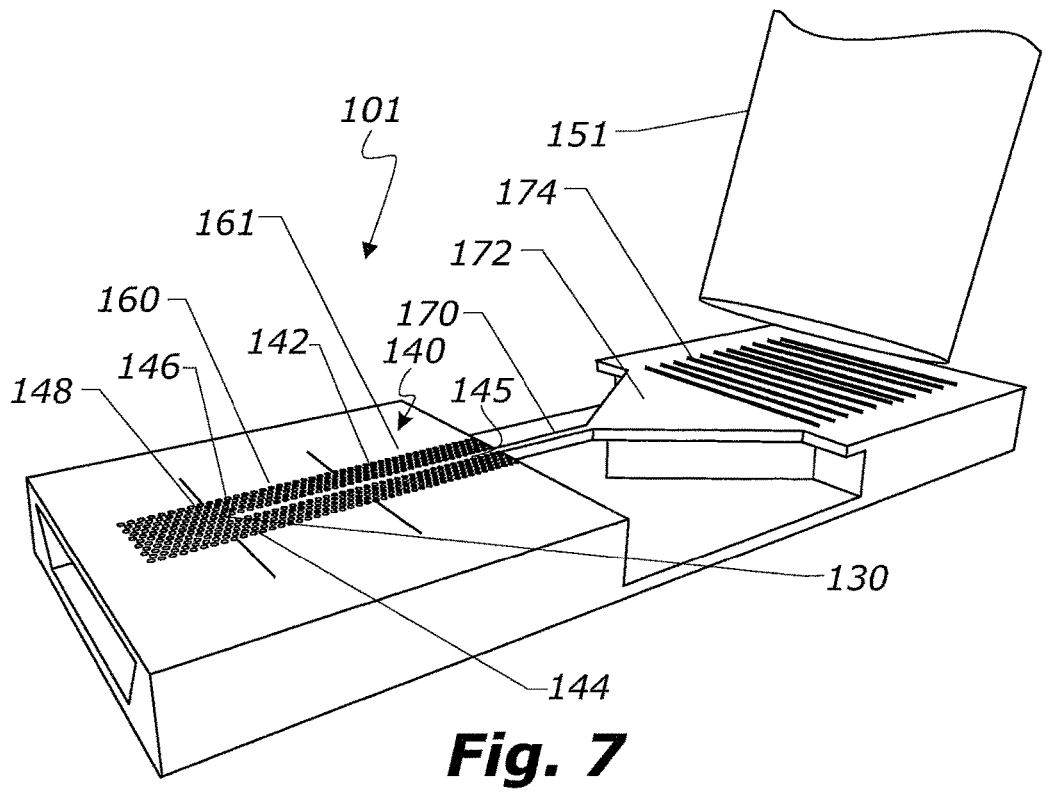
FIG. 7 shows a first preferred embodiment of an optical device according to the invention.

FIG. 7 shows a first preferred embodiment of an optical device 101 according to the invention. The optical device 101 comprises a planar waveguide 140, which is constructed as a floating structure along at least a substantial part of the planar waveguide 140. Such a design minimises the losses by minimising light being coupled out of the plane. The planar waveguide comprises a nanostructured section, which includes a longitudinal extending guiding region 145 with a first side 141 and a second side 143. A first nanostructure 142 is arranged on the first side 141 of the guiding region 145, and a second nanostructure 144 is arranged on the second side 143 of the guiding region 145. The nanostructured section comprises a slow-mode section 160 (or high-$n_g$ section), and a quantum emitter 146 in form of a quantum dot is embedded in a proximal end of the slow-mode section in a highly efficient light-matter coupling area 130. The slow-mode section ensures a light-matter interface, where a single photon with very high efficiency can be coupled to the waveguide (for a single-photon source) or be detected (for a single-photon detector), since light is slowed down and light-matter coupling is increased dramatically. At the same time, the surrounding nanostructure suppresses spontaneous emission into all other mode, thereby increasing effective coupling to the desired guided mode.

The nanostructured section of the planar waveguide 140 further comprises a fast-mode section 161 (or low-$n_g$ section) and optionally a slow-to-fast mode transition section between the slow-mode section 160 and the fast-mode section 161, and as previously explained, the conversion of guided slow modes to guided fast modes can be made without loss in the nanostructured section, either by impedance matching or a gradual conversion. The conversion to fast modes via the fast mode section 161 ensures that the light can be effectively coupled to a conventional waveguide, such as a ridge waveguide.

The fast-mode section 160 is coupled to a ridge waveguide 170, which has a first width, and which is coupled to a pre-grating transition section 172, which in turn is coupled to an out-of-plane grating-to-fibre coupler 174. The grating-to-fibre coupler 174 has a second width, and the pre-grating transition section is tapered from an end proximal to the grating-to-fibre coupler 174 towards the ridge waveguide 170 from the second width to the first width.

The grating-to-fibre coupler 174 is adapted to coupling light out of the planar waveguide 140 and into the core 151 of an optical fibre, preferably a single-mode fibre. The grating-to-fibre coupler is further adapted to match a field profile of the single-mode optical fibre.

The fast-mode section 161 ensures that the guided modes are converted to fast modes, thereby being able to more efficiently couple to the ridge waveguide 170. The use of a ridge waveguide is desirable, since guided modes of conventional waveguides may more efficiently be routed off-chip and coupled into the core 151 of the optical fibre. The width of the pre-grating transition section 172 gradually changes from the width of the ridge waveguide 170 to the width of the out-of-plane grating-to-fibre coupler 174, which is matched to the diameter of the core 151 of the single-mode optical fibre.

The nanostructured section comprises a termination 148 at the proximal end of the slow-mode section 160.

Overall, the emission of a single photon can thereby be obtained and coupled into the core 151 of the single-mode optical fibre with near-unity probability, which is a huge improvement over prior art system and which makes the setup feasible as a commercial quantum-emitter.

The planar waveguide 140 is advantageously made from a dielectric material, such as a III-V semiconductor material. The material may for instance be made of Gallium Arsenide (GaAs), Indium Gallium Arsenide (InGaAs), or Aluminium Arsenide (AlAs). This provides a waveguide particular adapted to for instance quantum dots. The quantum dot is preferably also made of an III-V semiconductor material. The quantum dot advantageously has a height of 1-10 nm, and an in-plane size in the range of 10-70 nm and may consist of approximately $10^5$ atoms. In one advantageous embodiment, the planar waveguide 140 is made from GaAs and the quantum dot 146 from InGaAs. The quantum dot 146 may for instance be epitaxial grown, e.g. via molecular beam epitaxy or deposition.

The first nanostructure 142 and the second nanostructure 144 may in the slow-mode section 160 be arranged with a triangular (or hexagonal) lattice having a lattice constant a. The lattice constant a may advantageously lie in the interval 100-500 nm, e.g. around 250 nm. The nanostructures may be substantially circular shaped and have a radius of between 0.2a and 0.4a, e.g. around 0.3a. As previously mentioned, the lattice is stretched in the fast-mode section 161 such that the lattice constant is slightly larger in the longitudinal direction of the planar waveguide 140.

The slow-mode section 160 advantageously has a longitudinal extent of at least 4-60 lattice constants a. Thereby, it is ensured that the slow-mode section 160 is sufficiently long to enable good coupling and that it does not become lossy by being too long.

Similarly, the fast-mode section 161 advantageously has a longitudinal extent of 4-60 lattice constants a. Thereby, it is ensured that the photon propagation length is sufficient to enable good coupling to the guided mode of the planar waveguide. In embodiments with a slow-to-fast mode transition section, this section may for instance have a length in the range 2-10 lattice constants a.

The guiding region is often formed by removing a line of holes. Accordingly, the transverse distance between centres of proximal nanostructures (e.g. holes) on the first side and the second side is √3 times the lattice constant a, e.g. in the region of 150-1000 nm.

The first width of the ridge waveguide 170 may advantageously correspond to the width of the guiding region 145 of the nanostructured section. The second width roughly corresponds to that of the diameter of the core 151 of the single-mode fibre, which is typically in the range from 1-10 micrometers. The pre-grating transition section 172 is designed so that the guiding region is gradually changed from the first width and the second width. The length of the pre-grating transition section 172 depends on the diversion angle of the sides of the waveguide as well as the dimensions of the first width and second width.

The first nanostructure 142 and the second nanostructure 144 may comprise air holes. However, in principle the nanostructure 142, 144 may also be made of a different material than the remainder of the planar waveguide material and having a refractive index being different from that of the remainder. The planar waveguide 140 may be adapted to guide light within a wavelength interval in the region of 620-1200 nm, and correspondingly the quantum emitter emits photons having a wavelength within said interval.

The planar waveguide 140 may advantageously have a thickness of 0.5a-0.6a, or equivalently in the range from 125-150 nm. Accordingly, it is seen that the planar waveguide 140 is a slab waveguide or also what in the technical area is called a membrane.

The grating-to-fibre coupler 174 is advantageously designed as a second-order Bragg grating.

Overall, the optical device 101 provides a highly efficient single-photon source, where the single photons may be coupled to an optical fibre with more than 90% probability, which is a huge improvement over prior art single-photon systems.

So far, the invention has only been described in relation to an optical device comprising a quantum emitter or single-photon emitter. However, the planar waveguide may also be used in a detector, in which case the light coupling between the different sections of the planar waveguide functions in reverse.

Figure 8:
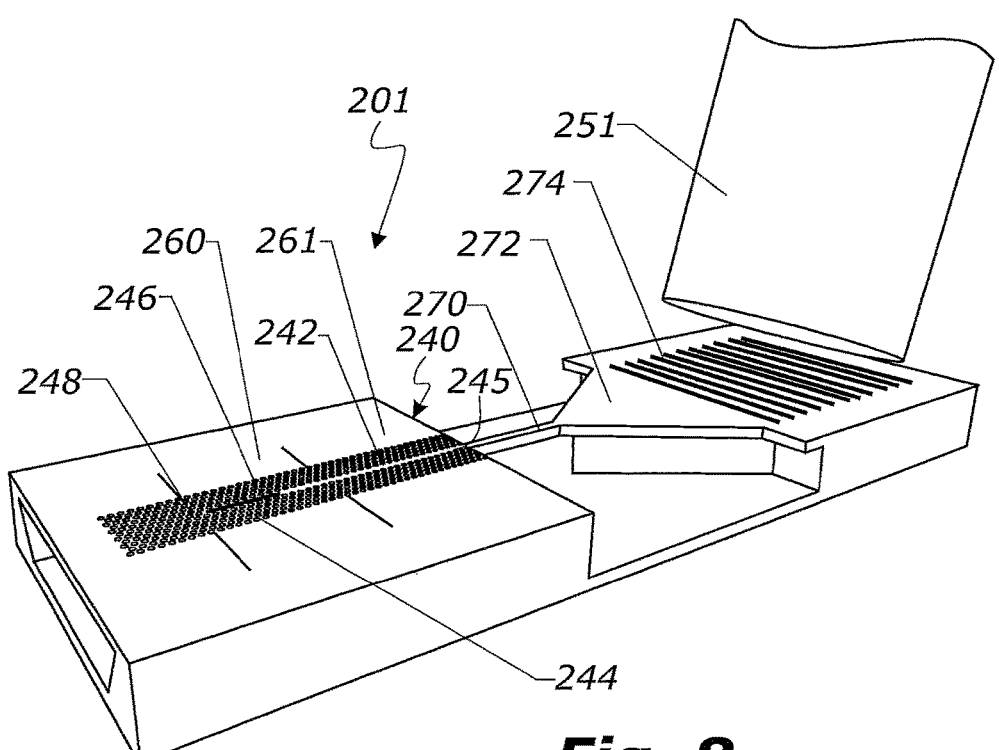
FIG. 8 shows a second preferred embodiment of an optical device according to the invention.

FIG. 8 shows a second preferred embodiment of an optical device 201, which operates as a single-photon detector. In the figure like numerals refer to like part of the embodiment shown in FIG. 7. Therefore, only the differences between the two setups are described.

In this setup, light is coupled out of the core 251 of the single-mode optical fibre and into a fibre-to-grating coupler 274, which couples the light into the plane of the planar waveguide 240. The fibre-to-grating coupler 274 is coupled to a tapered waveguide section 272, which in turn is coupled to a ridge waveguide 270. The ridge waveguide 270 is coupled to a nanostructured section comprising a fast-mode section 261 and a slow-mode section 260. A single-photon receiver 246 in form of a nanowire or a super-conducting wire is arranged on the substrate in the slow-mode section 260.

Thereby, the optical device 201 provides a highly efficient single-photon detector setup with a very small dead time. The use of a slow-mode section 260 ensures that the super conducting wire constituting the detector can be made much shorter than prior art systems, which in turn reduced the time constant of the detection circuit by a factor of 20-100.

Similar to the quantum emitter setup shown in FIG. 7, the single-photon detector setup is preferably adapted to detect single-photons in the wavelength range of infrared light, visible light, and ultraviolet light. However, the detector setup may also be adapted to detect other wavelength, such as in the microwave range, the x-ray range or the like.

Figure 9:
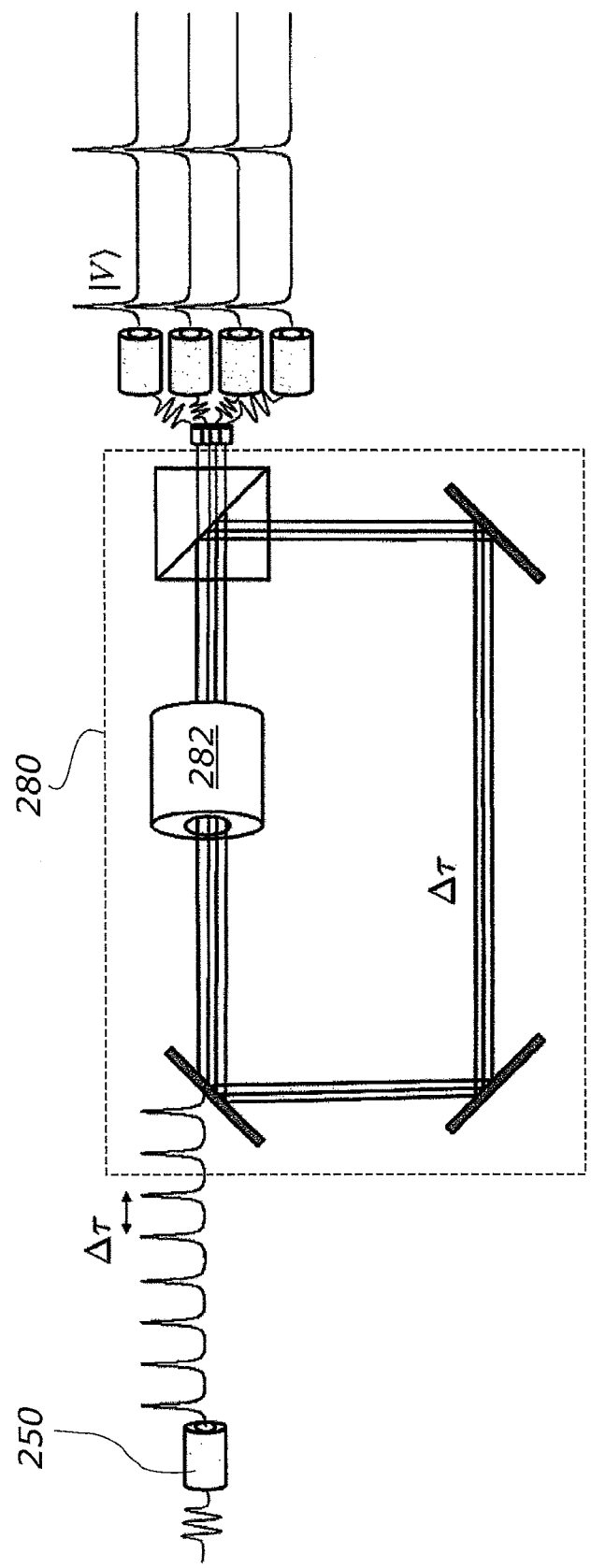
FIG. 9 shows a multiplexing setup for multiplexing single-photons emitted from an optical device according to the invention.

In order to exploit the single-photon source of any of the previous shown embodiment, the single-photon source needs to be multiplexed. FIG. 9 shows an embodiment for carrying out the multiplexing. The single photons that are generated from one of the previous embodiments have been coupled into a single-mode optical fibre 250. The single-photons are generated with a repetition rate of $\Delta\tau$. The single-photons are coupled into a delaying loop 280, which comprises a pockels cell 282. The single photons are delayed with a time scale corresponding to the repetition rate $\Delta\tau$, so as to align the single photons, which in turn may be coupled out of the loop and multiplexed into a plurality of waveguides, e.g. optical fibres. It is contemplated that many of these functions may be carried out on-chip in the future. However, it is much simpler to create the necessary delays off-chip and in particular using fibre optical components.

The invention has been described with reference to advantageous embodiments. However, the scope of the invention is not limited to the illustrated embodiments, and alterations and modifications can be carried out without deviating from the scope of the invention, which is defined by the following claims.

LIST OF REFERENCE NUMERALS

| | |
|---|---|
| 1, 101, 201 | Optical device |
| 10 | Photonic crystal structure |
| 11 | Line defect |
| 12 | Air holes |
| 20 | Upper region |
| 21 | Lower region |
| 22 | Upper, left region |
| 23 | Fundamental propagating mode |
| 24, 25 | Other propagating modes |
| 30, 130 | Area of enhanced dipole |
| 40, 40', 140, 240 | Planar waveguide |
| 41, 41', 141, 241 | First side |
| 42, 42', 142, 242 | First nanostructure |
| 43, 43', 143, 243 | Second side |
| 44, 44', 144, 244 | Second nanostructure |
| 45, 45', 145, 245 | Guiding region |
| 46, 46', 146 | Quantum emitter/quantum dot |
| 246 | Quantum detector/nanowire/super-conducting wire |
| 47, 47' | slow-mode section/high-$n_g$ section |
| 48, 48', 148, 248 | Termination |
| 49, 49' | Fibre coupler |
| 50 | Optical fibre |
| 51, 151, 251 | Core of optical fibre |
| 52 | Cladding of optical fibre |
| 60, 60', 160, 260 | Slow-mode section (high-$n_g$ section) |
| 61, 61', 161, 261 | Fast-mode section (low-$n_g$ section) |
| 65 | Slow-mode waveguide band |
| 66 | Fast-mode waveguide band |
| 67 | Impedance matching region |
| 68 | Slow-to-fast mode transition section |
| 170, 270 | Ridge waveguide |
| 172, 272 | Pre-grating transition section |
| 174, 274 | Out-of-plane grating-to-fibre coupler |
| 280 | Delay loop |
| 282 | Pockels cell |
| a, $a_1$, $a_2$ | Lattice constant/inter-hole spacing |
| X, Y | Dipoles |

The invention claimed is:

1. An optical device comprising:
a single-photon device, which is coupled to a planar waveguide, wherein the planar waveguide comprises a nanostructured section, which includes:
a longitudinal extending guiding region with a first side and a second side,
a first nanostructure arranged on the first side of the guiding region, and
a second nanostructure arranged on the second side of the guiding region,
wherein the nanostructured section comprises a slow-mode section, in which the single-photon device is positioned or embedded, and in which the first nanostructure and second nanostructure suppress spontaneous emission into other modes,
wherein the planar waveguide further comprises: a fibre coupler for coupling light out of the planar waveguide and into an optical fibre.

2. An optical device according to claim 1, wherein the planar waveguide further comprises a fast-mode section arranged after the slow-mode section.

3. An optical device according to claim 2, wherein the fast-mode section is directly coupled to the slow-mode section and wherein the fast-mode section and slow-mode section are impedance matched.

4. An optical device according to claim 1, wherein the planar waveguide further comprises a slow-to-fast transition section arranged after the slow-mode section providing a transition from slow-mode light to fast-mode light.

5. An optical device according to claim 1, wherein the fiber coupler comprises and out-of-plane grating-to-fibre coupler having a second width and being adapted to coupling light out of the device and match the field profile of an optical fiber.

6. An optical device according to claim 5, wherein a pre-grating transition section having a gradual transition from the first width to the second width is arranged between the ridge waveguide and the grating-to-fibre coupler.

7. An optical device according to claim 1, wherein the planar waveguide includes a ridge waveguide having a first width and arranged so that the fast-mode light from the nano-structured section is coupled into the ridge waveguide.

8. An optical device according to claim 1, wherein the planar waveguide further comprises a fast-mode section arranged after the slow-mode section, a ridge waveguide arranged after the fast-mode section, and the fibre coupler is arranged after the ridge waveguide.

9. An optical device according to claim 8, wherein the fiber coupler comprises an out-of-plane grating-to-fiber coupler, and wherein a pre-grating transition section having a gradual transition from a first width of the ridge waveguide to a second width of the out-of-plane grating-to-fiber coupler is arranged between the ridge waveguide and the out-of-plane grating-to-fiber coupler.

10. An optical device according to claim 1, wherein the optical device is made of an III-V semiconductor material.

11. An optical device according to claim 1, wherein the optical device is provided on a single substrate.

12. An optical device according to claim 1, wherein the nanostructured section is a photonic crystal waveguide.

13. An optical device according to claim 1, wherein the nanostructured section comprises a termination at a proximal longitudinal end of the slow-mode section.

14. An optical device according to claim 1, wherein the first nanostructure and the second nanostructure in the fast-mode section is stretched in the longitudinal direction so that a mutual longitudinal distance between holes of the nanostructures in the fast-mode section is at least 2% larger than the mutual longitudinal distance in the slow-mode section.

15. An optical device according to claim 1, wherein the single-photon device is a single-photon emitter.

16. An optical device according to claim 1, wherein the single-photon device is a quantum dot, a nanowire or a super-conducting wire.

17. An optical device according to claim 1, wherein the out-of-plane grating-to-fiber coupler comprises surface gratings.

18. An optical device according to claim 1, further comprising an optical fiber having a first end arranged so as to be able to couple in light from the out-of-[plane grating-to-fibre coupler, alternatively couple light emitted from the first end into the out-of-plane grating-to-fiber coupler.

19. An optical fiber according to claim 18, wherein the optical fiber is a single-mode fiber.

20. An optical device according to claim 18, wherein the optical device is further coupled to a demultiplexing setup using a pockels cell.

21. An optical device according to claim 20, wherein the pockels cell is arranged in a loop.

22. An optical device according to claim 20, wherein parallel trains of single photons are demultiplexed into individual optical fibers.

* * * * *